United States Patent
Kadowaki

(10) Patent No.: US 9,958,024 B2
(45) Date of Patent: May 1, 2018

(54) LIQUID SEALED VIBRATION ISOLATING DEVICE

(71) Applicant: YAMASHITA RUBBER KABUSHIKI KAISHA, Fujimino-shi, Saitama (JP)

(72) Inventor: Hirokazu Kadowaki, Fujimino (JP)

(73) Assignee: YAMASHITA RUBBER KABUSHIKI KAISHA, Fujimino-Shi (JP)

(*) Notice: Subject to any disclaimer, the term of this patent is extended or adjusted under 35 U.S.C. 154(b) by 0 days. days.

(21) Appl. No.: 15/302,256

(22) PCT Filed: Apr. 17, 2015

(86) PCT No.: PCT/JP2015/061861
§ 371 (c)(1),
(2) Date: Oct. 6, 2016

(87) PCT Pub. No.: WO2015/159976
PCT Pub. Date: Oct. 22, 2015

(65) Prior Publication Data
US 2017/0023088 A1    Jan. 26, 2017

(30) Foreign Application Priority Data

Apr. 18, 2014 (JP) ................................ 2014-086743

(51) Int. Cl.
*F16F 13/10* (2006.01)
*B60K 5/12* (2006.01)

(52) U.S. Cl.
CPC .......... *F16F 13/105* (2013.01); *B60K 5/1208* (2013.01); *F16F 13/10* (2013.01); *F16F 13/106* (2013.01); *F16F 13/107* (2013.01)

(58) Field of Classification Search
CPC ........ F16F 13/10; F16F 13/105; F16F 13/106; F16F 13/107

(Continued)

(56) References Cited

U.S. PATENT DOCUMENTS

| 6,619,636 B2 * | 9/2003 | Yamamoto | F16F 13/101 267/140.13 |
| 8,424,854 B2 * | 4/2013 | Ichikawa | F16F 13/105 267/140.13 |

(Continued)

FOREIGN PATENT DOCUMENTS

| JP | 2008-138854 | 6/2008 |
| JP | 2009-2420 | 1/2009 |

(Continued)

OTHER PUBLICATIONS

International Search Report, dated Jul. 14, 2015 (Jul. 14, 2015).

*Primary Examiner* — Thomas W Irvin
(74) *Attorney, Agent, or Firm* — Rankin, Hill & Clark LLP

(57) ABSTRACT

In an elastic partition member, a movable diaphragm outer circumferential section for supporting an outer circumference of an elastic movable diaphragm is formed integral with a relief valve. The elastic movable diaphragm is integrally formed with the elastic movable diaphragm. An upward circular arc projection that extends upwardly is provided on an upper part of the movable diaphragm outer circumferential section, and is fixed by a fixing portion provided in an upper member of a partition. A portion in the vicinity of a base portion of the relief valve is formed as a rectilinear unsupported portion that is flush with the elastic movable diaphragm. The base portion extends rectilinearly along the unsupported portion. When being opened, the relief valve is easily bent by the rectilinear base portion and is elastically deformable large enough to extend above the unsupported portion.

12 Claims, 9 Drawing Sheets

(58) Field of Classification Search
USPC .................................................. 267/140.13
See application file for complete search history.

(56) References Cited

U.S. PATENT DOCUMENTS

| | | | | |
|---|---|---|---|---|
| 8,474,799 | B2* | 7/2013 | Michiyama | F16F 13/106 |
| | | | | 267/121 |
| 8,490,954 | B2* | 7/2013 | Saito | F16F 13/106 |
| | | | | 267/140.13 |
| 8,651,467 | B2* | 2/2014 | Ishikawa | F16F 13/106 |
| | | | | 267/140.13 |
| 8,783,668 | B2* | 7/2014 | Ishikawa | F16F 13/08 |
| | | | | 267/140.11 |
| 8,794,606 | B2* | 8/2014 | Kubo | F16F 13/106 |
| | | | | 267/140.13 |
| 8,876,093 | B2* | 11/2014 | Kubo | F16F 13/106 |
| | | | | 267/140.13 |
| 9,488,246 | B2* | 11/2016 | Satori | F16F 13/106 |
| 9,695,902 | B2* | 7/2017 | Kadowaki | F16F 13/106 |
| 2008/0284075 | A1* | 11/2008 | Saito | F16F 13/105 |
| | | | | 267/140.13 |
| 2012/0299229 | A1* | 11/2012 | Kubo | F16F 13/106 |
| | | | | 267/140.13 |

FOREIGN PATENT DOCUMENTS

| | | | | |
|---|---|---|---|---|
| JP | 2009-52675 | | 3/2009 | |
| JP | 2013-174322 | | 9/2013 | |
| JP | 2014122665 A | * | 7/2014 | ............ F16F 13/106 |
| WO | 2011/105404 | | 9/2011 | |

\* cited by examiner

LIQUID SEALED VIBRATION ISOLATING DEVICE

TECHNICAL FIELD

The present invention relates to a relief valve for preventing cavitation provided in a liquid sealed vibration isolating device, and particularly, to the liquid sealed vibration isolating device in which the relief valve is provided integral with a part of an elastic partition member partitioning a liquid chamber into a primary liquid chamber and a secondary liquid chamber.

By the way, in the present invention, since the relief valve extends partially in the circumferential direction along an outer circumferential edge of the elastic partition member having a circular shape in a plan view, the direction along the circumferential direction of the outer circumferential edge shall be referred to as the longitudinal direction of the relief valve. The same shall apply to a prior art example to be referred to below.

BACKGROUND ART

In a publicly known liquid sealed engine mount, an elastic movable diaphragm is provided in a partition means for partitioning a liquid chamber into a primary liquid chamber and a secondary liquid chamber to absorb an internal pressure of the primary liquid chamber. A relief valve is provided in an outer circumference of the elastic movable diaphragm in such a way that when the primary liquid chamber turns to such a negative pressure that the primary liquid chamber causes cavitation (this state shall be a condition of cavitation occurrence), the relief valve is opened to allow liquid of the secondary liquid chamber to be leaked rapidly to the primary liquid chamber, so that a liquid pressure of the primary liquid chamber is heightened thereby to prevent the cavitation.

As such an elastic partition member formed integral with the relief valve, there is disclosed, for example, the partition member which has a circular shape in a plan view and includes a thick-wall section of annular shape provided in an intermediate part in the radial direction thereof. An inner side of the thick-wall section functions as the elastic movable diaphragm, and the relief valve is integrally formed with an outer side of the thick-wall section. The thick-wall section is sandwiched by the rigid partition means from above and below so as to form an outer circumferential section of the movable diaphragm of the elastic partition member.

PRIOR ART REFERENCE

Patent reference 1: Japanese Patent Application Laid-Open Publication JP 2008-138854A.

DISCLOSURE OF THE INVENTION

Problem to be Solved by the Invention

FIG. 9 is a cross sectional view of the relief valve as explained in the above prior art example, in which the relief valve is in an open state. When the relief valve of the above construction is opened, a tip portion 254 is separated apart from an inner wall portion 227 facing a leak passage 240 under the cavitation occurrence conditions and bent inwardly (in the direction of a center of an elastic movable diaphragm), so that the leak passage 240 is opened and hydraulic liquid leaks from a secondary liquid chamber 224 to a primary liquid chamber 222. The relief valve 236 is elastically deformed in such a way as to be bent inwardly along a base portion 252 connected to a movable diaphragm outer circumferential section 234. When a tip 254 of the relief valve 236 comes into contact with an upper part of the movable diaphragm outer circumferential section 234, the relief valve 236 is bent inwardly no more. At that time, since the upper part of the movable diaphragm outer circumferential section 234 functions as a stopper for the relief valve 236 in the open state and regulates a maximum opening amount, the relief valve 234 is not able to widely open inwardly beyond the movable diaphragm outer circumferential section 234.

Moreover, even in the open state of the relief valve 236, a large part of the relief valve 236 is located in the leak passage 240 and is bent in such a condition that the leak passage 240 is clogged partially with the relief valve 236. As a result, the leak passage 240 is narrowed to a certain extent by the relief valve 236 and a passage cross section is reduced. Therefore, since a flow rate of the liquid passing through the leak passage 240 is decreased, the leak passage is hard to perform rapid and large leak, and there is a possibility of delaying the prevention of the cavitation occurrence.

It is therefore an object of the present invention to allow a relief valve to be deformed large enough to make larger a passage cross section of a leak passage.

Means for Solving the Problem

In order to achieve the above object, according to a first feature of the present invention, there is provided a liquid sealed vibration isolating device comprising a partition means (20) for partitioning an internally provided liquid chamber into a primary liquid chamber (22) and a secondary liquid chamber (24), being provided with an orifice (28) which provides communication between the primary liquid chamber (22) and the secondary liquid chamber (24) and with an elastic partition member (30), the elastic partition member (30) including an elastic movable diaphragm (32) for absorbing an internal pressure fluctuation of the primary liquid chamber (22), a movable diaphragm outer circumferential section (34) surrounding a circumference of the elastic movable diaphragm (32) and being supported by a fixing portion (29e) provided in a portion of the partition means (20), and a relief valve (36) integrally projecting outwardly from the movable diaphragm outer circumferential section (34), and a leak passage (40) being formed in the partition means (20) to provide communication between the primary liquid chamber (22) and the secondary liquid chamber (24) and being opened and closed by the relief valve (36), wherein the relief valve (36), when being opened, is bent from a base portion (52) located on the movable diaphragm outer circumferential section (34) and extends inwardly toward an upper surface on a primary liquid chamber side of the elastic movable diaphragm (32), wherein the movable diaphragm outer circumferential section (34) includes a supported portion (34b) which is fixed by the fixing portion (29e) and an unsupported portion (34a) which is not fixed by the fixing portion (29e), and wherein the unsupported portion (34a) is provided on an internal side of and in the vicinity of the base portion (52) of the relief valve (36), and the base portion (52) extends rectilinearly.

According to a second feature of the present invention, in the liquid sealed vibration isolating device as defined in the first feature, the supported portion is formed of a projecting portion (34b) which projects upwardly and is fixed by the fixing portion (29e), and the unsupported portion (34a) is formed of a concave portion which is recessed from the projecting portion (34b).

According to a third feature of the present invention, in the vibration isolating device as defined in the second feature, the unsupported portion (34a) is formed flush with an upper surface of the elastic movable diaphragm (32).

According to a fourth feature of the present invention, in the vibration isolating device as defined in any one of the first to third features, a valve length (VL) of the relief valve (36) varies in such a way as to get longer with approach to a middle portion in the longitudinal direction of the relief valve (36).

According to a fifth feature of the present invention, in the vibration isolating device as defined in any one of the first to fourth features, the unsupported portion (34a) is of rectilinear shape.

Effects of the Invention

According to the first feature of the present invention, the unsupported portion (34a) of the movable diaphragm outer circumferential section (34), which is not fixed by the fixing portion (29e) is provided on the internal side of and in the vicinity of the base portion (52) of the relief valve (36). Therefore, when the relief valve (36) is opened, the elastic deformation of the relief valve (36) is not retarded by the movable diaphragm outer circumferential section (34). For this reason, the relief valve (36) is bent from the base portion (52) toward an upper surface side of the elastic movable diaphragm (32) and can be elastically deformed in such a way as to extend upwardly and enter more inwardly than an outer lateral portion (39) of the movable diaphragm outer circumferential section (34). As a result, when the relief valve (36) is opened, a passage cross section of the leak passage (40) is able to be increased so as to leak a large amount of liquid rapidly, whereby the occurrence of cavitation can be restricted.

In addition, since the base portion (52) of the relief valve (36) extends rectilinearly in the vicinity of the unsupported portion (34a), the relief valve (36) is easy to be bent.

According to the second feature of the present invention, since the movable diaphragm outer circumferential section (34) is provided with the projecting portion (34b) formed as the supported portion and the unsupported portion (34a) formed of the concave portion which is recessed from the projecting portion (34b), the unsupported portion (34a) can be formed easily.

According to the third feature of the present invention, since the unsupported portion (34a) is formed flush with the upper surface of the elastic movable diaphragm (32), the relief valve (36) can be bent larger.

According to the fourth feature of the present invention, since the valve length (VL) of the relief valve (36) varies in such a way as to get longer with approach to the middle portion in the longitudinal direction of the relief valve (36), the relief valve (36) is easily bent from the middle portion in the longitudinal direction thereof which has the longest valve length (VL), so that the relief valve (36) can be opened rapidly. Moreover, in the case where the valve length (VL) extends longer, the relief valve (36) is elastically deformed sufficiently large, so that the leak passage (40) can be opened in a large way.

According to the fifth feature of the present invention, since the unsupported portion (34a) is of rectilinear shape, a length of the unsupported portion (34a) can be shortened and a supporting span between the supporting portions located in both ends in the longitudinal direction of the unsupported portion (34a) can be shortened, whereby the unsupported portion (34a) is easily provided in the elastic partition member (30).

BEST MODE FOR CARRYING OUT THE INVENTION

Figure 1:
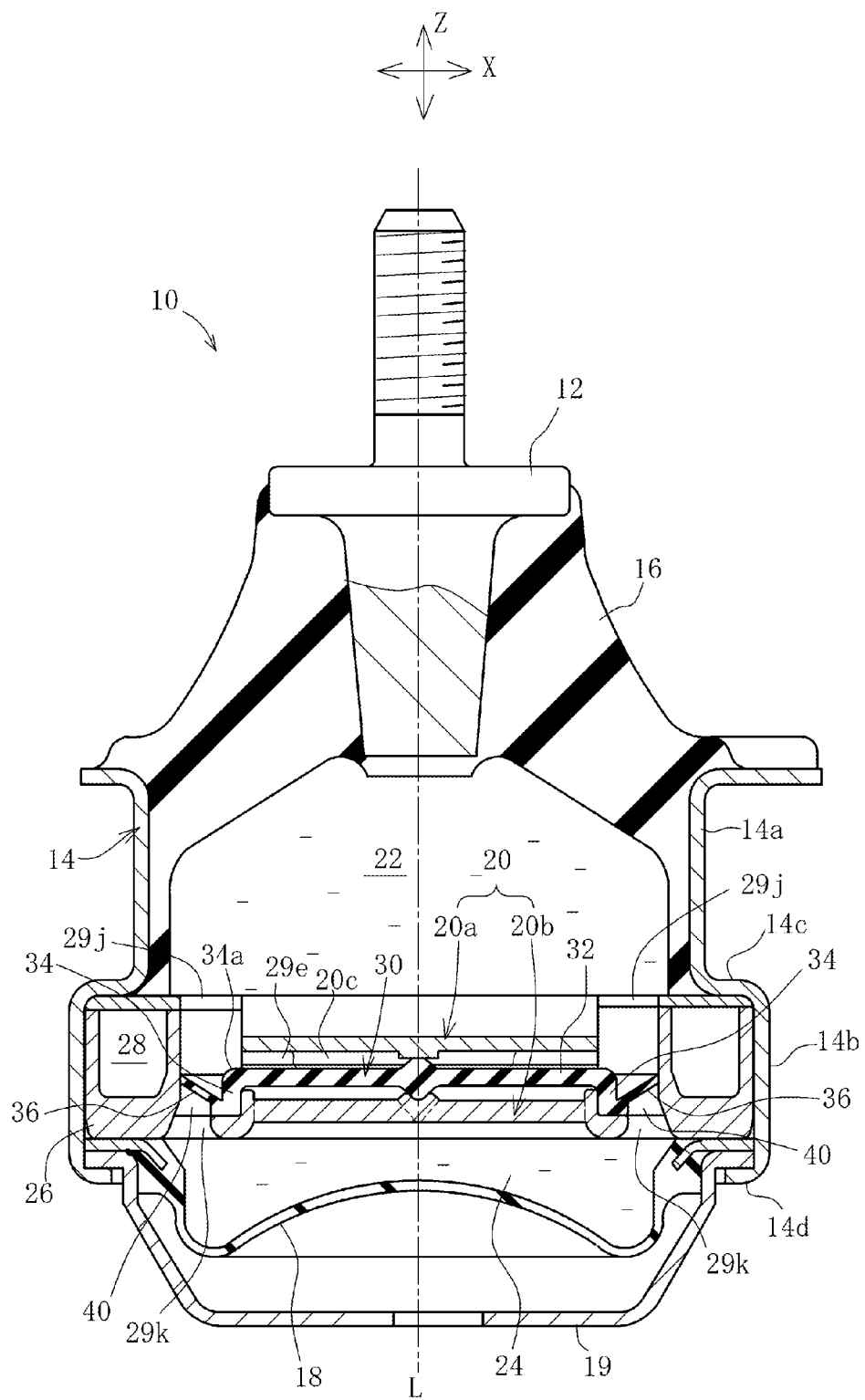
FIG. 1 is a longitudinal cross sectional view of an engine mount in accordance with an embodiment of the present invention.

Hereinafter, a liquid sealed vibration isolating device embodied as an engine mount for a motor vehicle will be explained with reference to the accompanying drawings. FIG. 1 is a longitudinal cross sectional view of an engine mount 10 (cross sectional view taken along a mount center line) in accordance with an embodiment of the present invention.

In the present invention, with respect to each of an upward and downward direction and a left and right direction, the upward and downward direction shall be the direction along a center line (mount center line) L of the engine mount 10 in FIG. 1, and the left and right direction shall be the direction orthogonal to the center line L of the engine mount 10. In addition, a Z direction along the center line L shall be the main vibration inputting direction. Moreover, reference characters X and Y (see FIG. 2) designate orthogonal two axes X and Y which lie at right angles to the center line L and intersect with each other in the same plane, wherein an X direction shall be the direction extending along the X axis, and a Y direction shall be the direction extending along the Y axis.

Referring now to these drawings, the engine mount 10 comprises a first metal fixture 12 to be mounted on the side of an engine (a vibration source, not shown) for example, a second metal fixture 14 of cylindrical shape to be mounted on the side of a vehicle body (a vibration transmitted side member, not shown), and an insulator 3 made of an elastic material such as rubber or the like and adapted to provide an elastic connection between the metal fixtures.

The insulator 16 is an elastic body of substantially a circular truncated cone shape functioning as a vibration isolating main body. A space surrounded by the second metal fixture 14 is provided in an interior of the insulator 16, and an opening of the space is closed so as to form a hermetically closed space. This hermetically closed space is filled with incompressible liquid whereby a liquid chamber is formed.

This liquid chamber is partitioned by a partition means 20 of circular shape in a plan view into a primary liquid chamber 22 on the side of the insulator 16 and a secondary liquid chamber 24 on the side of a diaphragm 18.

The second metal fixture 14 is narrowed at an upper part thereof to form a small diameter portion 14*a* and has a step portion 14*c* between the small diameter portion 14*a* and a large diameter portion 14*b*. An upper part on an outer circumference side of the partition means 20 is fixed in position by the step portion 14*c*.

An outer circumferential part of the diaphragm 18 is overlapped with a lower surface on the outer circumference side of the partition means 20, and an opening edge portion of a cup-shaped member 19 which covers the diaphragm 18 from below is overlapped with the diaphragm 18. When the opening edge portion of the cup-shaped member 19 is fixed by an inwardly bent lower end portion 14*d* of the second metal fixture 14, the partition means 20 is fixed in position.

The partition means 20 includes an upper member 20*a*, a lower member 20*b*, and an elastic partition member 30 accommodated in an accommodating chamber 20*c* which is an inner space formed between the upper member 20*a* and the lower member 20*b*. An orifice formation part 26 is formed on the outer circumferential side of the partition means 20. The orifice formation part 26 is formed around the entirety of an outer circumferential portion of the lower member 20*b* and has an upwardly open, substantially u-shaped cross section. When this upwardly open section is covered with an outer circumferential portion of the upper member 20*a*, a passage space of hollow ring shape is formed inside. This passage space provides communication between the primary liquid chamber 22 and the secondary liquid chamber 24, and forms an orifice 28 when the liquid flows through an interior of the passage space. The orifice 28 is configured to cause liquid column resonance at the time a predetermined low frequency large amplitude vibration is inputted, thereby to achieve high damping.

The elastic partition member 30 includes an elastic movable diaphragm 32 located in the middle portion thereof, a thick movable diaphragm outer circumferential section 34 surrounding an outer circumferential portion of the elastic movable diaphragm 32 in a circumferential frame shape, and a relief valve 36 formed on an outward side of the movable diaphragm outer circumferential section 34. The movable diaphragm outer circumferential section 34 is configured to support the outer circumferential portion of the elastic movable diaphragm 32, and a large part in the circumferential direction of the movable diaphragm outer circumferential section 34 is held between the upper member 20*a* and the lower member 20*b* so as to be fixed.

The relief valve 36 opens and closes a leak passage 40 which is formed on an inside of the orifice formation part 26 of the partition means 20. The leak passage 40 provides communication between the primary liquid chamber 22 and the secondary liquid chamber 24 through a valve opening 29*j* formed in the upper member 20*a* and a valve opening 29*k* formed in the lower member 20*b*.

Figure 2:
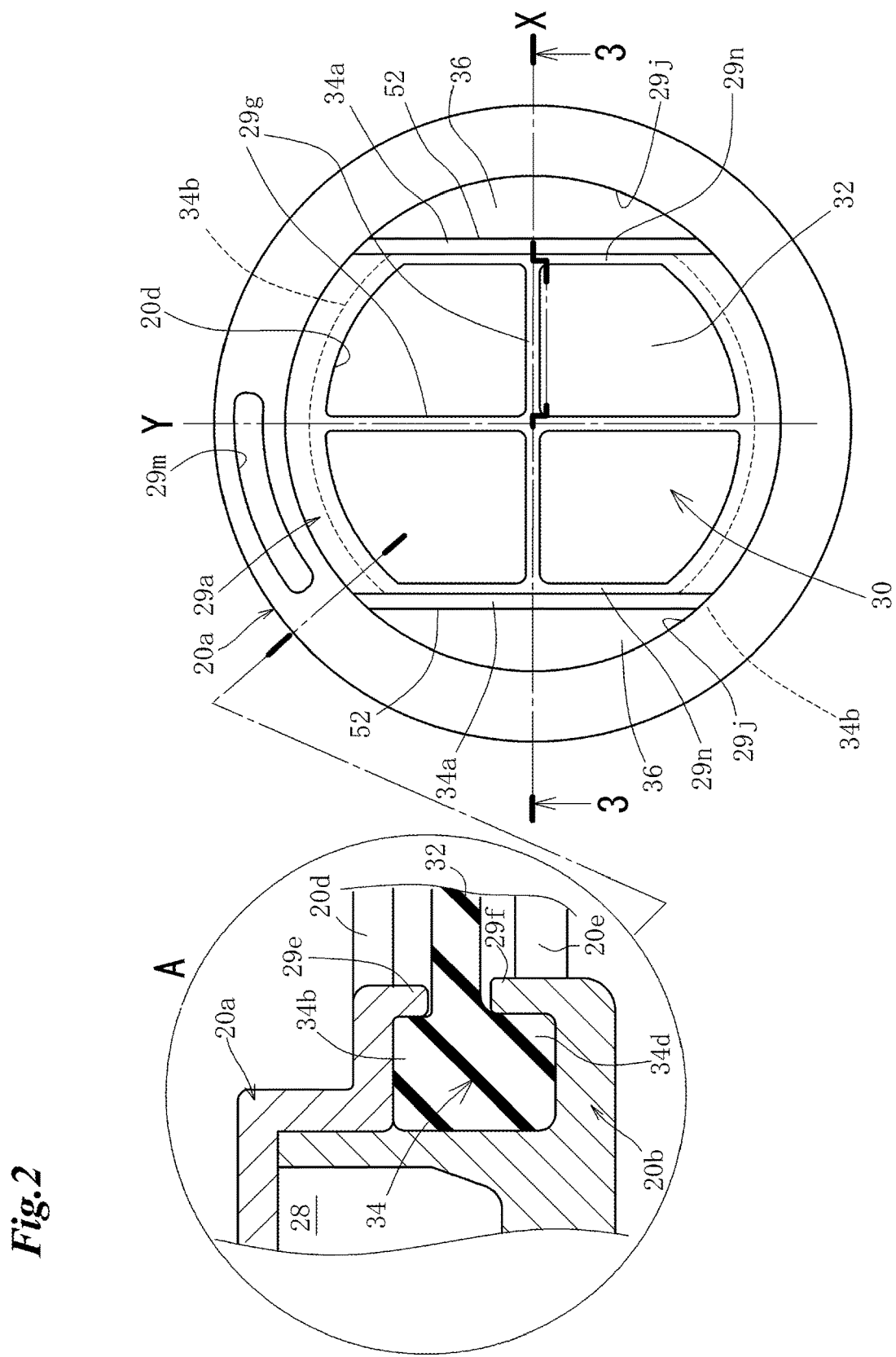
FIG. 2 is a plan view of a partition means.
Figure 3:
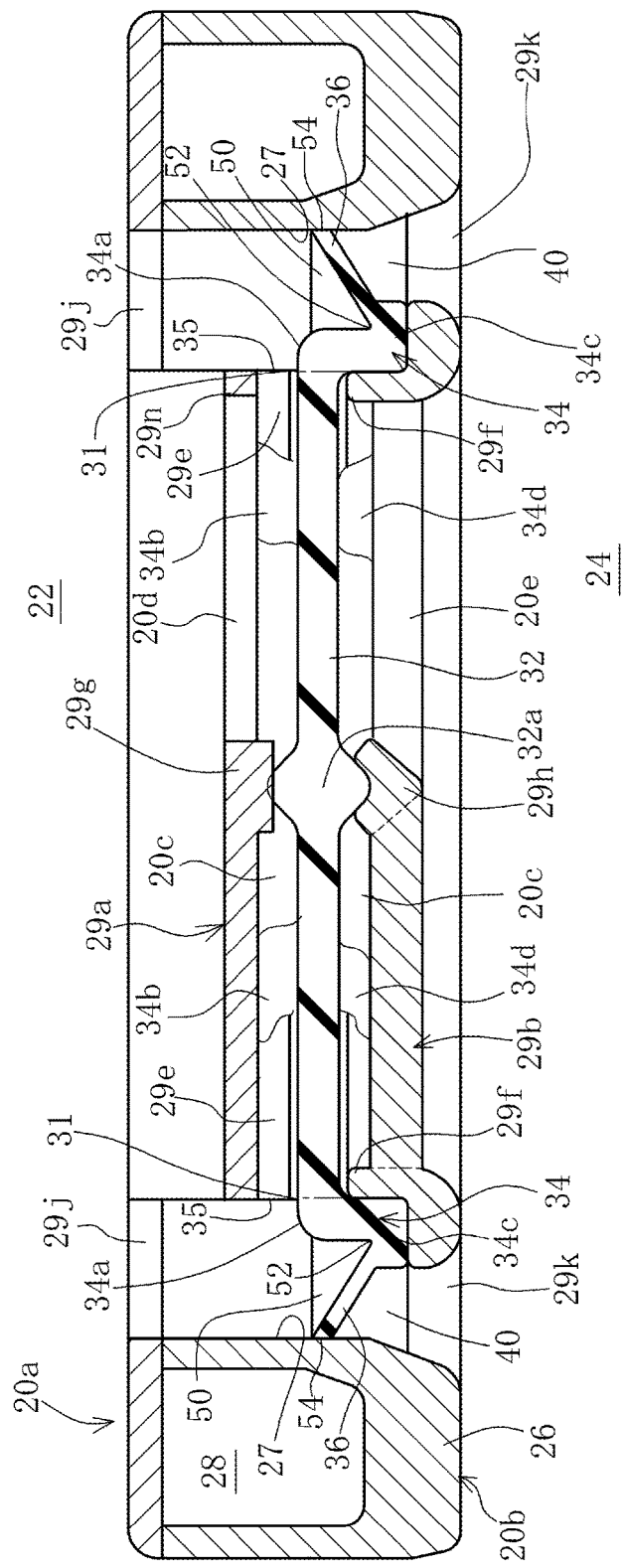
FIG. 3 is a cross sectional view taken on line 3-3 of FIG. 2.

Next, the partition means 20 will be explained in detail. FIG. 2 is a plan view of the partition means 20 as seen from the primary liquid chamber 22 side, and FIG. 3 is a cross sectional view taken on line 3-3 of FIG. 2. Herein, in FIG. 2, there is also shown a rotated cross sectional view (an enlarged part A) in which a portion of the outer circumferential part of the partition means 20 is enlarged.

As shown in FIG. 2, the upper member 20*a* is a circular member, of which a center portion is a step lower than the outer circumferential portion thereby to form a displacement regulating section 29*a*. A center opening portion 20*d* is provided in the middle portion of the displacement regulating section 29*a*, and a cross-shaped grid portion 29*g* is provided in the center opening portion 20*d*. Herein, the number of grids forming the grid portion 29*g* may be freely selected.

A pair of opposed valve openings 29*j* is provided on both sides of the center opening portion 20*d* in the X direction, and the relief valves 36 face the valve openings 29*j*. Each of the valve openings 29*j* is divided from the center opening 29*j* by a bridge 29*n* which extends long in the Y direction. An outer circumferential portion of each of the valve openings 29*j* is formed in the shape of a circular arc. Each end of an X direction extending portion of the grid portion 29*g* is connected to the bridge 29*n*. A reference character 29*m* designates a primary liquid chamber side opening of the orifice 28 which is located in the outer circumferential portion of the upper member 20*a* and opens at a radially outward position more than the valve opening 29*j*.

As shown in the enlarged part A of FIG. 2, an opening edge portion of the displacement regulating section 29*a* of the upper member 20*a* which faces the center opening portion 20*d* excluding a portion in which the valve opening 29*j* is formed is formed with a downwardly bent fixing portion 29*e*. The fixing portion 29*e* is bent downwardly to extend to an upper surface of the outer circumferential portion of the elastic movable diaphragm 32 and makes supporting contact with an upper surface and an inner circumferential wall surface of an upward circular arc projection 34*b* of the movable diaphragm outer circumferential section 34, so as to fix an upper surface side of the movable diaphragm outer circumferential section 34. A pair of fixing portions 29*e* is provided in substantially a semicircular arc shape in an opposed relationship in the Y direction with each other.

The lower member 20*b* has substantially a similar shape in a bottom plan view to the upper member 20*a* and, as shown in FIG. 3, is provided at the middle thereof with a displacement regulating section 29*b*. A center opening portion 20*e* is provided in the displacement regulating section 29*b*, and a grid portion 29*h* is provided in the center opening portion 20*e*. The grid portion 29*h* is the same as the grid portion 29*g* of the upper member 20*a*. In addition, fixing portions 29*f* are provided facing the center opening portion 20*e*. In the similar way to the fixing portion 29*e* of the upper member 20*a*, each of the fixing portions 29*f* makes supporting contact with a lower surface and a lower inner circumferential side of the movable diaphragm outer circumferential section 34.

However, different from the fixing portion 29*e* of the upper member 20*a*, the fixing portion 29*f* is configured to support not only a lower circular arc shaped projection 34*d* of substantially semicircular arc shape (see the enlarged part A of FIG. 2) forming a lower part of the movable diaphragm outer circumferential section 34 but also a lower rectilinear projection 34*c* (see FIG. 3) forming a base portion of the relief valve 36. Namely, the fixing portion 29*f* is continuously formed with substantially semicircular arc portions and rectilinear portions.

A valve opening 29*k* is provided between the fixing portion 29*f* and a lower portion of the orifice formation part 26 and provides communication between the secondary liquid chamber 24 and the leak passage 40. A secondary liquid chamber side opening of the orifice 28 is formed in a portion which is not shown in the drawing, and communicates with the secondary liquid chamber 24.

As shown in FIG. 3, the elastic movable diaphragm 32 is accommodated in an elastically deformable manner in the upward and downward direction in the accommodating chamber 20c which is formed between the displacement regulating sections 29a and 29b. A thick upward and downward protruded portion 32a formed integral with a central portion of the elastic movable diaphragm 32 makes contact with the grid portions 29g and 29h. The accommodating chamber 20c provides communication between the primary liquid chamber 22 and the secondary liquid chamber 24 through the center opening portions 20d and 20e each of which is formed in the upper member 20a and the lower member 20b.

The elastic movable diaphragm 32 is elastically deformed when the liquid in the primary liquid chamber 22 and the secondary liquid chamber 24 flow through the center opening portions 20d and 20e, so as to absorb the internal pressure fluctuation of the primary liquid chamber 22. The deformation amount of the elastic movable diaphragm 32 is regulated in a predetermined range by the upper and lower grid portions 29g and 29h. Moreover, when the liquid flows through the center opening portions 20d and 20e in accordance with the elastic deformation of the elastic movable diaphragm 32, the orifice 28 causes the liquid column resonance at the predetermined frequency on a relatively higher frequency side such that the orifice is clogged up. Hereinafter, this resonance shall be referred to as "hole resonance".

As shown in FIG. 3, the leak passage 40 is formed between an inner wall portion 27 of the orifice formation part 26 and the movable diaphragm outer circumferential section 34. In a normal condition, a tip portion 54 of the relief valve 36 closely contacts a wall surface of the inner wall portion 27 which faces the leak passage 40, so as to maintain the relief valve 36 in a closed state, so that the leak passage 40 is blocked between the primary liquid chamber 22 and the secondary liquid chamber 24.

At the time of cavitation occurrence conditions, the relief valve 36 is elastically deformed, such that the tip portion 54 thereof is separated apart from the inner wall portion 27 and bent to the movable diaphragm outer circumferential section 34 side. Thus, the relief valve 36 is brought into an open state and the leak passage 40 is opened.

Figure 4:
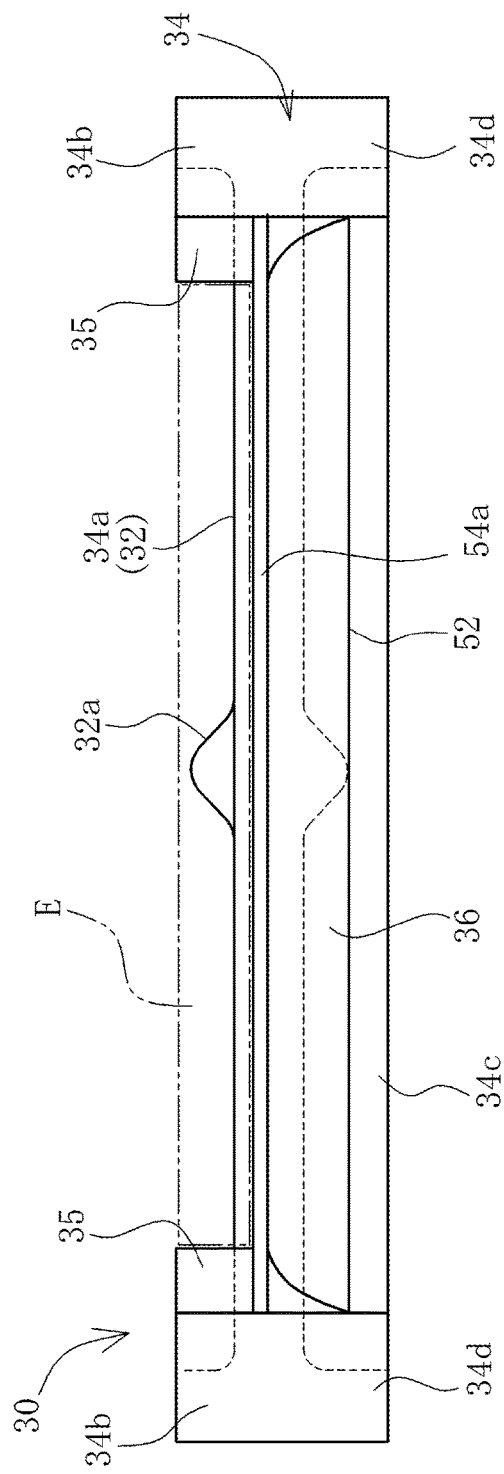
FIG. 4 is a side view of an elastic partition member.
Figure 6:
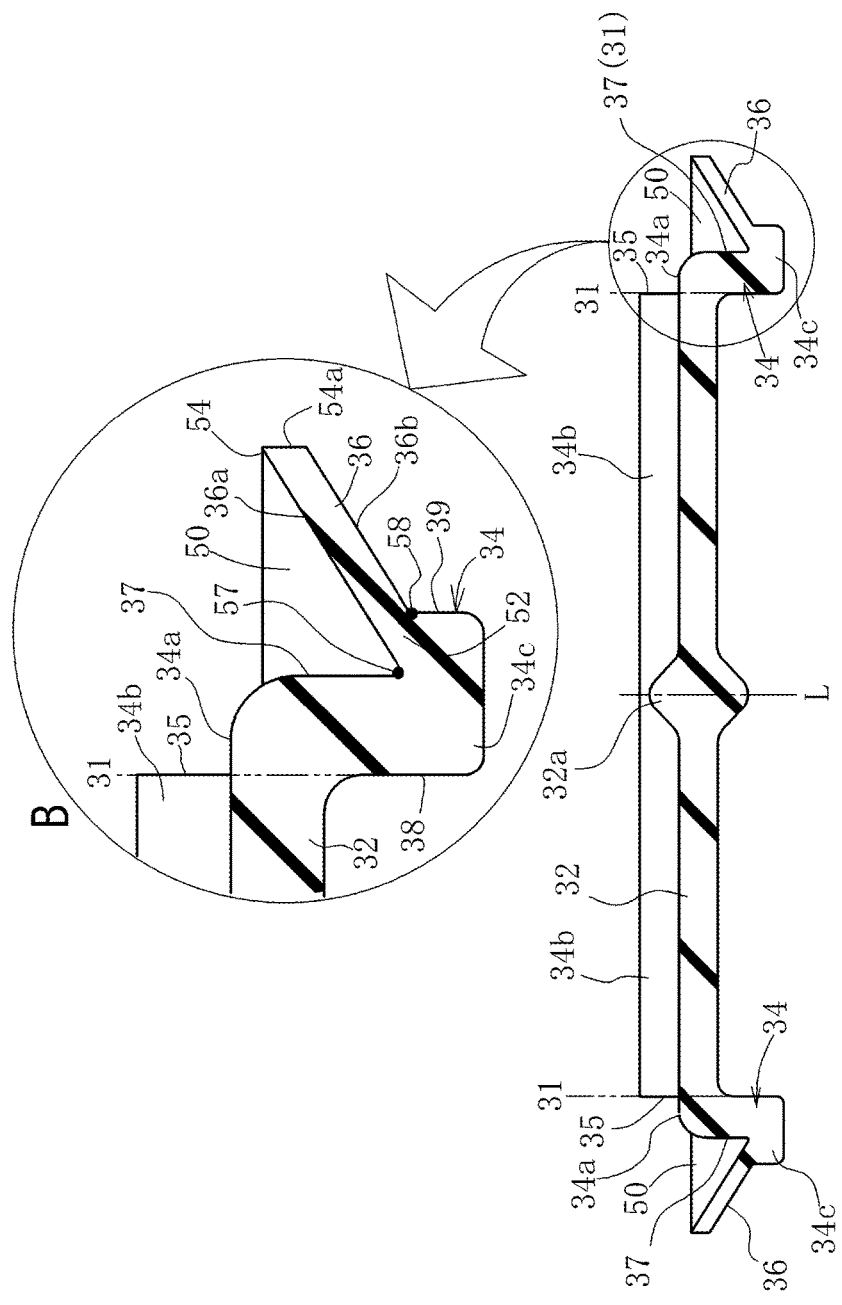
FIG. 6 is a cross sectional view taken on line 6-6 of FIG. 5.
Figure 7:
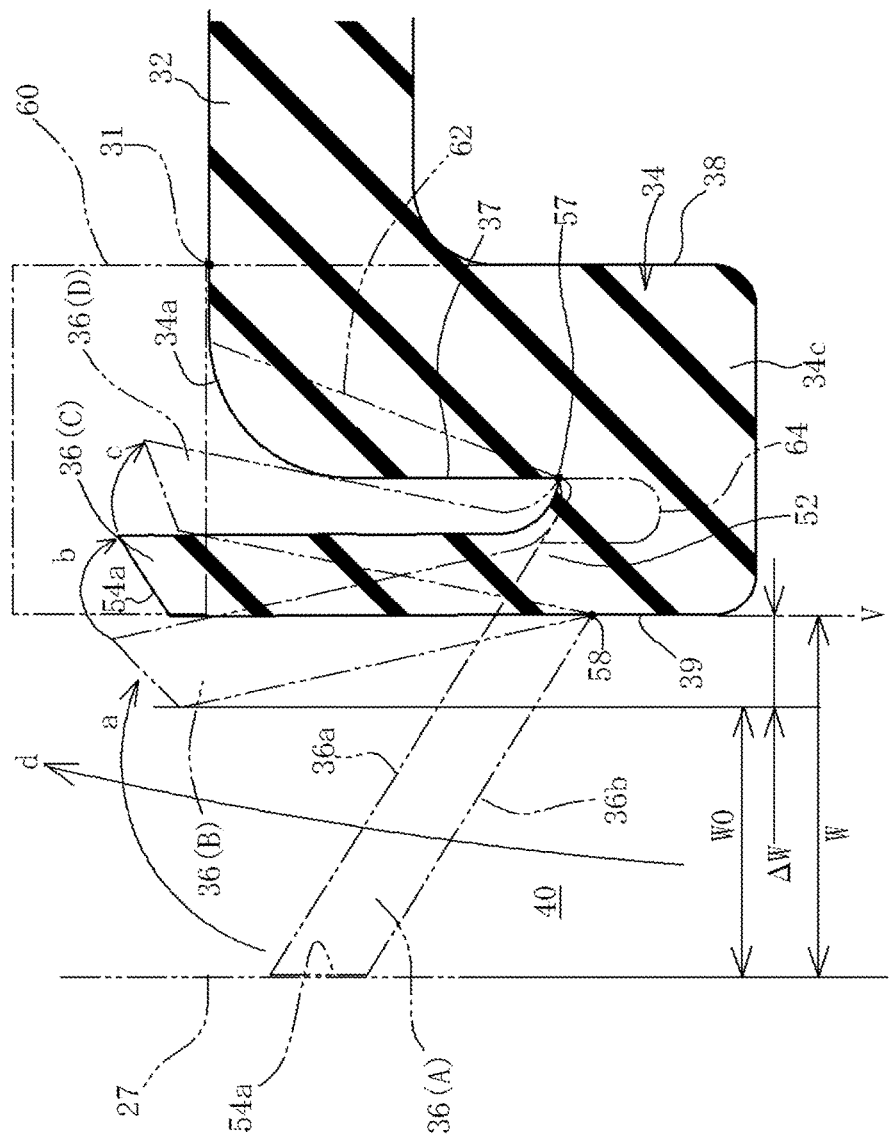
FIG. 7 is an enlarged cross sectional view of assistance in explaining a movement of a relief valve.

Next, the elastic partition member 30 will be explained with reference to FIGS. 4 to 7. FIG. 4 is a side view of the elastic partition member 30, FIG. 5 is a plan view thereof, FIG. 6 is a cross sectional view taken on line 6-6 of FIG. 5 (Additionally, an enlarged cross section of the relief valve is shown in an enlarged part B), and FIG. 7 is an enlarged cross sectional view of assistance in explaining an opening and closing movement of the relief valve 36.

Figure 5:
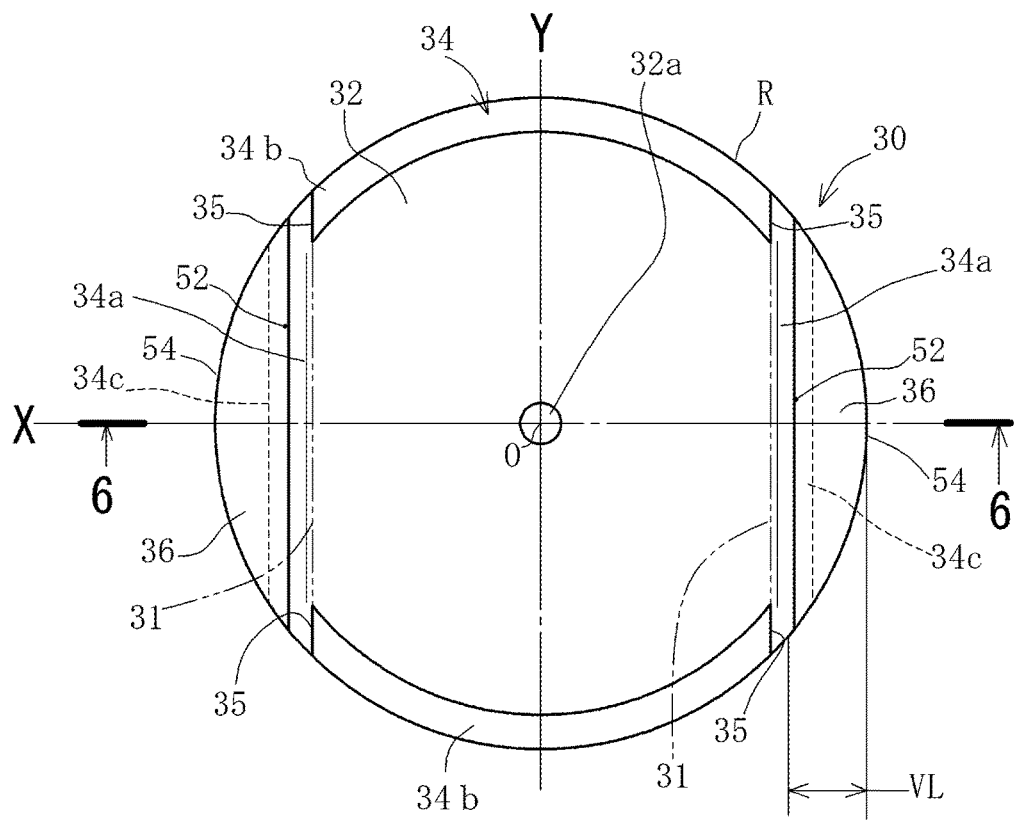
FIG. 5 is a plan view of the elastic partition member.

Referring to FIG. 5, the elastic partition member 30 as a whole has a circular shape in a plan view, and an outer circumferential circle formed by an outer circumference of the elastic partition member 30 is designated "R". This outer circumferential circle R is partitioned by a straight line portion 31 forming a chord. The elastic movable diaphragm 32 is provided in a region located on the side of a center O with respect to the straight line portion 31. The relief valve 36 is provided in substantially a crescent region located radially outwardly of the straight line portion 31.

The elastic movable diaphragm 32 is formed in substantially an elliptical shape consisting of a pair of circular arc sections and a pair of straight line sections. The outer circumference of the elastic movable diaphragm 32 is surrounded by the thick movable diaphragm outer circumferential section 34. On an upper part of the movable diaphragm outer circumferential section 34 there are provided unsupported portions 34a of rectilinear shape and the upward circular arc projections 34b projecting upwardly in substantially a semicircular arc shape. The unsupported portions 34a extend in parallel with the straight line portion 31 and are provided in pairs in an opposed relation in the X direction. The unsupported portions 34a are flush with the upper surface of the elastic movable diaphragm 32 without projecting upwardly from the elastic movable diaphragm 32 and, therefore, are not supported by the upper member 20a.

Each of the upward circular arc projections 34b corresponds to a supported portion of the present invention and is comprised of an circular arc-shaped projection which projects upwardly and integrally from the outer circumference of the elastic movable diaphragm 32 in such a way as to surround the circular arc portion of the elastic movable diaphragm 32 on the upper surface side thereof. The upward circular arc projections 34c are provided in pairs in an opposed relation in the Y direction and fixed by the fixing portions 29e (see the enlarged part A of FIG. 2).

The pair of upward circular arc projections 34b is not continuous in the X direction due to the unsupported portions 34a. Each end portion 35 in the longitudinal direction of the upward circular arc projections 34b has an end surface extending in parallel in the Y direction.

As shown in FIGS. 4 and 6, a lower part of the movable diaphragm outer circumferential section 34 also has downward rectilinear projections 34c and downward circular arc projections 34d each of which projects downwardly. Each of the downward rectilinear projections 34c is provided in a position corresponding to the unsupported portions 34a and extends in parallel in the Y direction. Each of the downward circular arc projections 34d is provided in substantially a semicircular arc shape corresponding to the upward circular arc projection 34b and fixed by each of the fixing portions 29f.

The downward rectilinear projection 34c and the downward circular arc projection 34d are formed continuous with each other in an annular shape in the circumferential direction. Herein, the annular shape means a closed state in a loop shape and it does not matter whether it is circle or non-circle.

As shown in FIGS. 2 and 3, when each of projecting tip portions of the upward circular arc projection 34b, the downward rectilinear projections 34c and the downward circular arc projections 34d of the movable diaphragm outer circumferential section 34 is held between the upper member 20a and the lower member 20b from above and below, the movable diaphragm outer circumferential section 34 is able to be firmly fixed and the elastic movable diaphragm 32 is able to be supported in an elastically deformable manner. In addition, an inward side of each of the portions is fixed by the fixing portions 29e and 29f, so that the inward inclination of the movable diaphragm outer circumferential section 34 can be prevented.

As shown in FIG. 4, on the assumption that an annular projection continuous with the upward circular arc projection 34b is formed in the upper part of the movable diaphragm outer circumferential section 34 in a similar way as the lower part of the movable diaphragm outer circumferential section 34, the upper part of the movable diaphragm outer circumferential section 34 corresponds to that having a cutout in a portion (a hypothetical portion shown by a reference character E located above the downward rectilinear projection 34c) corresponding to the downward rectilinear projection 34c, and the unsupported portion 34a is formed in this cutout portion. Accordingly, when viewed in the X direction, in the unsupported portion 34a there is formed no stopper which is continuous with the upward circular arc projection 34b and which projects upwardly in order for stopping the movement of the relief valve 36, so that the relief valve 36 can bent toward an upper side of the unsupported portion 34a.

As shown in FIG. 5, the relief valve 36 is formed in the outer circumferential part of the elastic partition member 30 and in the region located radially outwardly of the unsupported portion 34a of the movable diaphragm outer circumferential section 34. Namely, the relief valve 36 is provided in a remaining part (a section) of the outer circumferential circle R of the elastic partition member 30 partitioned by the unsupported portion 34a. An outer circumferential portion of the relief valve 36 is located on the outer circumferential circle R of the elastic partition member 30.

As shown in FIG. 6 and the enlarged part B thereof, the relief valve 36 is formed in such a way as to surround a recess 50 of V-shaped cross section which opens toward the primary liquid chamber 22. Moreover, the relief valve 36 is formed integral with the movable diaphragm outer circumferential section 34 in such a way as to extend obliquely upwardly from the downward rectilinear projection 34c of the movable diaphragm outer circumferential section 34 toward the primary liquid chamber 22 in a radially outward expanding manner.

The relief valve 36 includes a base portion 52 and tip portion 54. A seal surface 54a is formed on a part of the tip portion 54 which contacts the inner wall portion 27 facing the leak passage 40. The seal surface 54a, in a state of contacting the inner wall portion 27, is parallel to the inner wall portion 27 and also extends in parallel with the center line L. A length in the height direction of the seal surface 54a (a length of a portion which contacts the inner wall portion 27 in the height direction) has an influence on the rigidity of the tip portion 54 of the relief valve 36, and sealing contact with the inner wall portion 27 in a closed state is strengthened with increase in the length of the seal surface 54a. Therefore, at the time of not reaching the cavitation occurrence condition (in the normal condition), the length is adjusted so as to prevent a leak when a large amplitude vibration which is smaller than an excessive amplitude vibration is inputted and to have the rigidity enough to maintain the high damping.

As shown in the enlarged part B, a valve wall 37 surrounded by the relief valve 36 is formed in the vicinity of a portion of the movable diaphragm outer circumferential section 34 connected to the relief valve 36. In addition, the downward rectilinear projection 34c is provided with an inner lateral wall 38 and outer lateral wall 39. The valve wall 37 is a wall portion connected to an outside part of the unsupported portion 34a and is located in an intermediate position between an outside of the inner lateral wall 38 and an inside of the outer lateral wall 39.

As shown in FIG. 5, the valve wall 37 extends parallel to the straight line portion 31 in a plan view. The straight line portion 31 overlaps with the inner lateral wall 38, and the outer lateral wall 39 extends parallel to the valve wall 37 and the straight line portion 31.

The relief valve 36 is formed integrally continuous with the downward rectilinear projection 34c through the base portion 52. The base portion 52 functions as a starting point of a bend of the relief valve 36 and is of substantially rectilinear shape similar to the valve wall 37 in a plan view (see FIG. 5). Since the base portion 52 is formed in substantially the rectilinear shape which is parallel to the unsupported portion 34a, the relief valve 36 is easily bent inwardly (to the unsupported portion 34a side) from the base portion 52 as the starting point by the liquid pressure of the secondary liquid chamber side by which the relief valve 36 is absorbed to the primary liquid chamber side when the primary liquid chamber turns to such negative pressure that the cavitation occurs.

The base portion 52 includes an upper surface side connecting point 57 at which an upper surface 36a of the relief valve 36 is connected to the valve wall 37 and a lower surface side connecting point 58 at which a lower surface 36b of the relief valve 36 is connected to the outer lateral wall 39 of the downward rectilinear projection 34c (see the enlarged part B of FIG. 6).

In this embodiment, the upper surface side connecting point 57 is substantially as high as or a little higher than the lower surface side connecting point 58, and the upper surface side connecting point 57 is located inwardly apart from the lower surface side connecting point 58 by approximately a thickness of the relief valve 36. With this construction, the relief valve 36 is able to be bent easily. By the way, the upper surface side connecting point 57 may be located in a position lower than the lower surface side connecting point 58, and as a result, the relief valve 36 can be bent more easily.

Referring to FIG. 5, the relief valve 36 is formed in the shape of a section in a plan view, which is surrounded by the unsupported portion 34a and a part of an outer circumferential circular arc part of the outer circumferential circle R. Therefore, a valve length VL varies in the longitudinal direction such that a middle portion in the longitudinal direction (a portion located on an X axis in the drawing) is longest and each end portion in the longitudinal direction is shortest. Namely, the relief valve 36 varies such that the valve length becomes gradually longer with approach toward the middle portion from each of the end portions in the longitudinal direction. The end portions in the longitudinal direction of the relief valve 36 are connected to end portions in the Y direction of the valve wall 37.

Like this, due to the setting of the long valve length VL and the provision of the long base portion 52, etc. the relief valve 36 is able to be easily opened even if it has the high rigidity. Namely, in the case where the relief valve 36 has the relatively large thickness and the high rigidity, the relief valve 36 is able to be deformed evenly as a whole without local deformation. As a result, the relief valve 36 becomes easy to be bent around the base portion 52 as a center.

Next, the operation of this embodiment will be explained.

In the case of having loaded the engine mount of this embodiment into the vehicle, the rigidity of the elastic movable diaphragm 32 is adjusted previously so as not to be elastically deformed by the low frequency large amplitude vibration such as a shake vibration. Therefore, when such vibration is inputted, the liquid in the primary liquid chamber 22 flows through the orifice 28 between the primary liquid chamber 22 and the secondary liquid chamber 24, whereby to cause the liquid column resonance by the orifice 28 to realize the high damping.

Further, since the seal surface 54a of the relief valve 36 keeps contacting the inner wall portion 27 (FIG. 3) so as to prevent the leak, it is possible to realize the high damping.

When the high frequency small amplitude vibration such as a booming noise is inputted, the orifice 28 is clogged and the internal pressure of the primary liquid chamber 22 rises, so that the elastic movable diaphragm 32 is elastically deformed in such a way as to absorb this internal pressure and to realize low dynamic spring.

Further, since the elastic movable diaphragm 32 extends partially to the outer circumferential part of the elastic partition member 30, an area of the elastic movable diaphragm 32 can be increased in comparison with the case where the entire circumference on the outer circumferential side of the elastic movable diaphragm 32 is used as a relief valve formation region, and a pressure receiving area relative to the liquid pressure of the primary liquid chamber 22 can be expanded sufficiently.

Further, since due to the elastic deformation of the elastic movable diaphragm 32, the liquid moves between the primary liquid chamber 22 and the upper surface of the elastic movable diaphragm 32 through the center opening portion 20d, the hole resonance is produced. The resonance frequency of this hole resonance is influenced by the flow amount of the liquid, and this flow amount of the liquid is influenced by a passage cross section of the center opening portion 20d.

Next, when the primary liquid chamber 22 turns to the negative pressure such as to cause the cavitation by the input of the excessive amplitude vibration, the relief valve 36 is opened, and the liquid flows from the secondary liquid chamber 24 through the leak passage 40 into the primary liquid chamber 22, so that the negative pressure of the primary liquid chamber 22 is cancelled rapidly so as to prevent the occurrence of the cavitation phenomenon.

At that time, as shown in FIG. 7, a part forming the unsupported portion 34a of the upper surface of the movable diaphragm outer circumferential section 34 in the vicinity of the base portion 52 of the relief valve 36 is formed of a recess without projection such as the upward circular arc projection 34b and is flush with the upper surface of the elastic movable diaphragm 32. Therefore, when the relief valve 36 is opened, there is no stopper portion such as the upward circular arc projection 34b to stop a bend of the relief valve 36 in the bending direction thereof.

Accordingly, at least a portion of the tip portion 54 of the relief valve 36 which is bent to open the leak passage 40 moves in such a way as to enter inwardly beyond an outer circumferential line V which is a perpendicular line passing along the outer lateral wall 39 of the downward rectilinear projection 34c.

Therefore, a sufficiently large opening width W is formed in the leak passage 40 and the passage cross section of the leak passage 40 is expanded by the opened relief valve 36, so that the liquid can move rapidly and in a large amount.

More specifically, if the stopper 60 such as the downward rectilinear projection 34c is formed in the unsupported portion 34a in the vicinity of the base portion 52 of the relief valve 36 and an outer lateral surface of this stopper 60 is located on the outer circumferential line V, the relief valve 36(A) in the closed position is opened in such a way as indicated by an arrow a, and the tip portion 54 of the upper surface of the relief valve 36 comes into contact with the outer lateral surface (indicated by the outer circumferential line V) of the stopper to stop the opening movement of the relief valve 36. At that time, since the relief valve 36 is located in a position 36(B) shown in a phantom line, and a large part of the relief valve 36 containing the tip portion 54 side stays in the leak passage 40, the leak passage 40 is narrowed by the staying amount. An opening width in this state is designated W0.

However, in the present invention, since in the unsupported portion 34a, there is no stopper 60 which stops the bend of the relief valve 36, the relief valve 36 is opened further from the position 36(B) to a position 36(C) shown in a solid line in such a way as indicated by an arrow b, so that the large part of the relief valve 36 containing the tip portion 54 side moves inwardly (toward the center of the elastic movable diaphragm 32) of the outer circumferential line V. In this state, almost all of the relief valve 36 enters inwardly of the outer circumferential line V, namely, almost all of the relief valve 36 is located on the inside of and on the upper side of the outer lateral wall 39 of the downward rectilinear projection 34c forming the movable diaphragm outer circumferential section 34, so that the part narrowing the leak passage 40 is limited to a small part in the vicinity of the lower surface side connecting point 58. Therefore, the opening width W of the leak passage 40 corresponds substantially to a space between the outer circumferential line V and the inner lateral wall 27 and is larger than W0 by a difference W.

Accordingly, since the part in the vicinity of the base portion 52 of the relief valve 36 is formed as the unsupported portion 34a and the stopper 60 is not provided in the unsupported portion 34a, the relief valve 36 can be opened larger up to the position 36(C) shown in the solid line, so that in comparison with the position 36(B) shown in the phantom line, the relief valve 36 can be opened larger by the difference ΔW.

Furthermore, in the position 36(C), there is a gap between the relief valve 36 and the valve wall 37. Therefore, the relief valve 36 is bent further inwardly as indicated by an arrow c until it comes into contact with the unsupported portion 34a, whereby to be able to reach a position 36(D). In this position, the leak passage 40 is opened larger enough to make smoother the leak of the liquid flowing in such a way as indicated by an arrow d.

The relief valve 36 also is able to be bent inwardly of the outer circumferential line V like the above when the valve wall 37 is located sufficiently inwardly of the outer circumferential line V in a condition where the upper surface side connecting point 57 is substantially as high as or slightly higher than the lower surface side connecting point 58 and is located inwardly at a distance corresponding to the thickness of the relief valve 36 from the lower surface side connecting point 58. In this case, if an upper part of the valve wall 37 is inclined to enter inwardly as shown in a phantom line 62, the relief valve 36 can be bent further from the position 36(D) toward an upper side of the unsupported portion 34a. In addition, when the upper surface side connecting point 57 is lower than the lower surface side connecting point 58 and an upwardly open groove is formed as shown in a phantom line 64, the relief valve 36 can be more easily bent.

In this embodiment, since the upper surface of the portion of the movable diaphragm outer circumferential section 34 corresponding to the base portion 52 of the relief valve 36 is formed as the unsupported portion 34a without provision of the stopper 60, the relief valve 36 can be deformed sufficiently large without resistance even if it has the greater valve length, and so, the relief valve 36 can be opened rapidly and sufficiently large.

Further, since the base portion 52 is of rectilinear shape in a plan view, the relief valve 36 can be bent evenly as a whole from the base portion 52 provided in parallel with the unsupported portion 34a, and can be bent with a smaller resistance in comparison with the case where the base portion is formed in a curved shape. In addition, the relief valve 36 can be opened smoothly and rapidly, whereby the occurrence of the cavitation phenomenon can be prevented effectively.

Furthermore, it is possible to achieve both the expansion of an area of the elastic movable diaphragm 32 and the expansion of an area of the relief valve 36. Moreover, in the case where the area of the elastic movable diaphragm 32 is equal to that of the conventional elastic movable diaphragm, the relief valve 36 can be provided at the outer circumferential part of the elastic partition member 30 and formed integral with the elastic movable diaphragm 32. In addition, the partition means 20 as a whole can be compactified while maintaining the area at a predetermined level.

Further, since the valve length VL of the relief valve 36 varies in such a way as to get longer with approach to the middle portion in the longitudinal direction of the relief valve 36, and the middle portion in the longitudinal direction of the relief valve 36 is longest in the valve length, the relief valve 36 can be opened at the low liquid pressure and the timing of the opening becomes faster. In addition, even if the opening as a whole is equalized, the starting time of the opening is slightly different in the circumferential direction, and the middle portion in the longitudinal direction is fastest. Therefore, since the relief valve 36 is opened gradually from the middle portion in the longitudinal direction as a leading portion toward each end in the longitudinal direction, the relief valve 36 is easily opened in the entire length in the longitudinal direction thereof.

Further, since the base portion 52 of the relief valve 36 is formed in the rectilinear shape extending substantially along the unsupported portion 34a, the relief valve 36 becomes smoother and easier to be opened up to each end in the longitudinal direction than the case where the base portion is formed in an arc shape. Moreover, since the unsupported portion 34a is of rectilinear shape, the length of the unsupported portion 34a can be shortened and the supporting span between both end portions 35 in the longitudinal direction of the unsupported portion 34a can be shortened, whereby the unsupported portion 34a is easily provided in the elastic partition member 30.

It is to be understood that the present invention is not limited to the above embodiments and that various changes and modifications may be made in the invention without departing from the spirit and the scope thereof. For example, the elastic movable diaphragm 32 is not necessarily formed in a non-circular shape. In addition, a portion of the unsupported portion 34a may be fixed partially.

For example, when a portion located inwardly of the position 36(D) in which the relief valve 36 is tilted beyond the outer circumferential line V in FIG. 7 and overlapped with the tip of the grid portion 29g in the X direction in FIG. 2 is fixed by a pressing portion which projects downwardly from the tip of the grid portion 29g in the X direction, the relief valve 36 is allowed to be bent inwardly beyond the outer circumferential line V, and the unsupported portion 34a is supported at three points consisting of both end portions 35 and the middle portion in which the pressing portion of the tip of the grid portion 29g is located. Therefore, the supporting span of the unsupported portion 34a corresponding to a distance between the supporting points can be narrowed whereby the unsupported portion 34a can be fixed more firmly. Thus, even if the unsupported portion 34a is lengthened, it can be fixed firmly.

Further, although the unsupported portion 34a and the upward circular arc projection 34b are formed by varying the projection heights in the upper surface of the movable diaphragm outer circumferential section 34, the unsupported portion may be formed also in the case where the projecting height of the movable diaphragm outer circumferential section 34 is uniform. In this case, there are provided projecting portions which project downwardly from the upper member 20a, and a portion which supports the upper portion of the movable diaphragm outer circumferential section 34 and a portion (unsupported portion) which does not support the upper portion thereof are provided by varying the length of the projecting portions.

Figure 8:
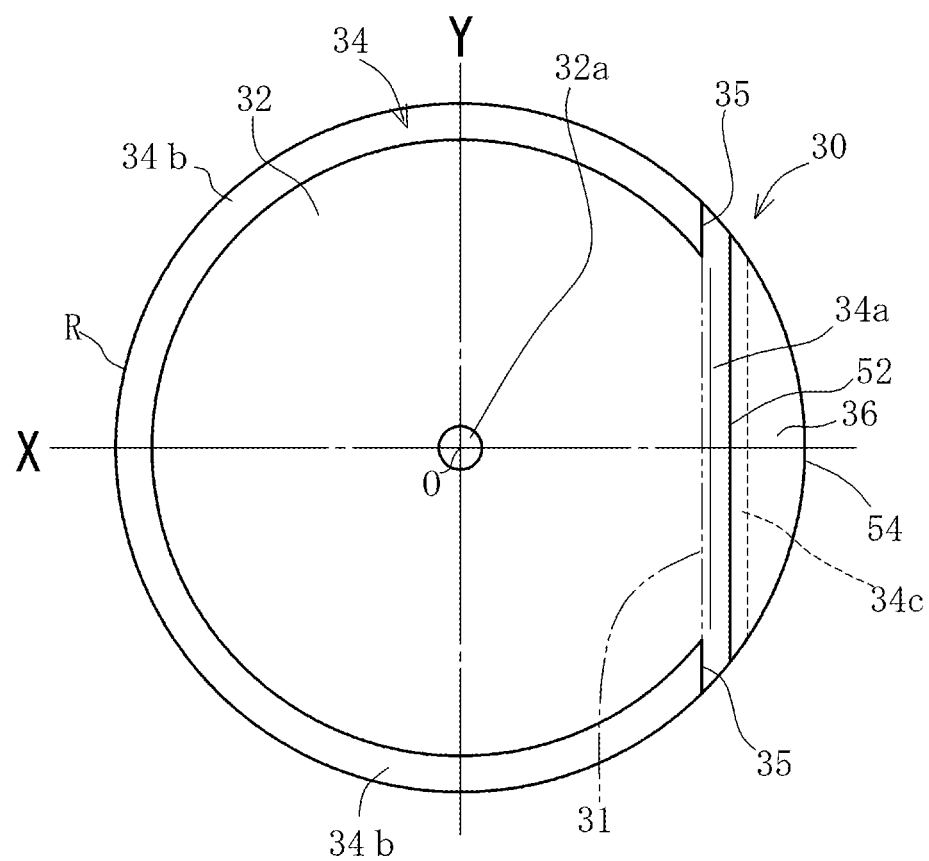
FIG. 8 is a plan view of the elastic partition member in accordance with another embodiment.
Figure 9:
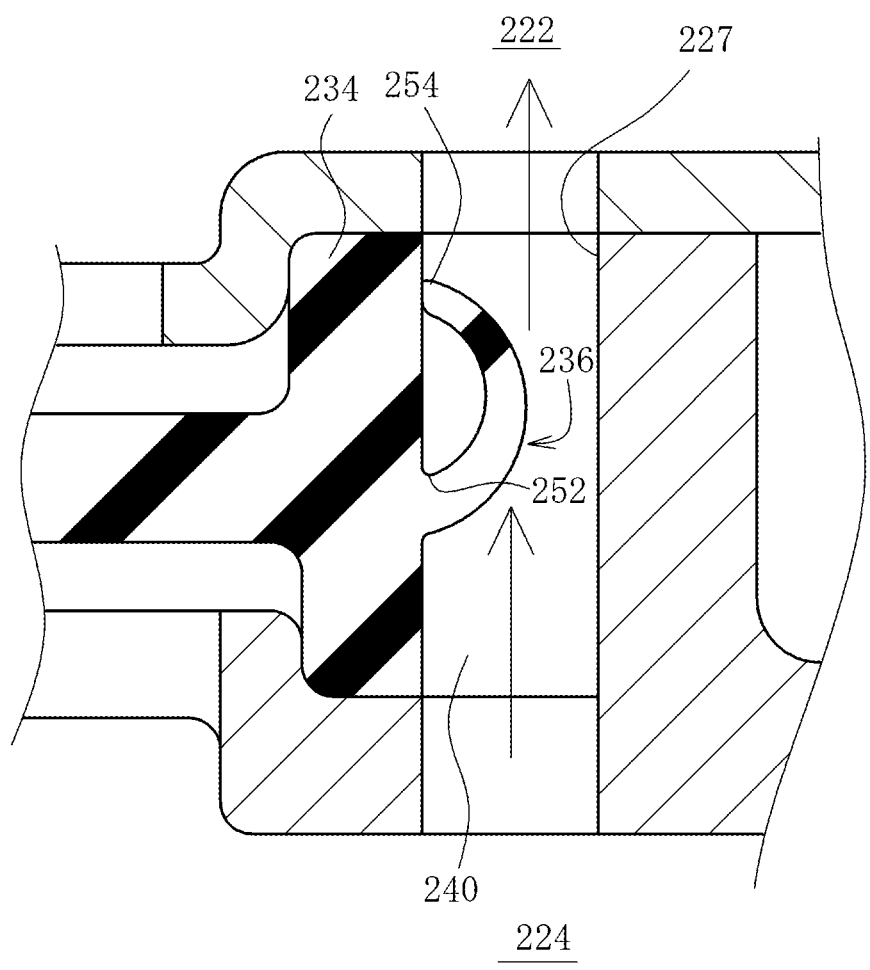
FIG. 9 is a cross sectional view showing an open state of the relief valve in accordance with a prior art example.

Further, the number of the relief valves 36 may be selected freely. For example, as shown in FIG. 8, a single relief valve as a whole may be selected. FIG. 8 corresponds to the drawing in which one of the relief valves 36 provided in pairs in symmetrical relation on the X axis in FIG. 5 is removed.

Further, the liquid sealed vibration isolating device is not limited to the engine mount but may be applied to various kinds of devices such as a suspension mount, etc.

What is claimed is:

1. A liquid sealed vibration isolating device comprising:
a partition means for partitioning an internally provided liquid chamber into a primary liquid chamber and a secondary liquid chamber, the partition means being provided with an orifice which provides communication between the primary liquid chamber and the secondary liquid chamber;
an elastic partition member being provided in the partition means and including an elastic movable diaphragm for absorbing an internal pressure fluctuation of the primary liquid chamber, a movable diaphragm outer circumferential section surrounding a circumference of the elastic movable diaphragm and being supported in a portion of the partition means, and a relief valve integrally projecting outwardly from the movable diaphragm outer circumferential section; and
a leak passage being formed in the partition means to provide communication between the primary liquid chamber and the secondary liquid chamber and being opened and closed by the relief valve;
wherein the relief valve, when being opened, is bent from a base portion located on the movable diaphragm outer circumferential section and extends inwardly toward an upper surface on a primary liquid chamber side of the elastic movable diaphragm;
wherein the elastic partition member as a whole has a circular shape in a plan view and is partitioned by a straight line portion forming a chord in the outer circumferential circle into the elastic movable diaphragm, which is provided in a region located on a side of the straight line portion toward a center of the elastic partition member, and the relief valve, which is provided in substantially a crescent region located radially outwardly of the straight line portion,
wherein the movable diaphragm outer circumferential section on the upper surface side of the elastic partition member includes a supported portion, which is fixed by the fixing portion, and an unsupported portion, which is not fixed by the fixing portion and extends parallel to the straight line portion; and
wherein the unsupported portion is provided on an internal side of and in a vicinity of the base portion of the relief valve and a stopper of the relief valve is not provided in the vicinity of the base section so as to permit the relief valve to curve inward,
and the base portion extends parallel to the straight line portion and rectilinearly along the unsupported portion.

2. The liquid sealed vibration isolating device according to claim 1, wherein the supported portion is formed of a projecting portion which projects upwardly and is fixed by the fixing portion, and the unsupported portion is formed of a concave portion which is lower than the projecting portion.

3. The liquid sealed vibration isolating device according to claim 2, wherein the unsupported portion is flush with an upper surface of the elastic movable diaphragm.

4. The liquid sealed vibration isolating device according to claim 3, wherein a valve length of the relief valve varies in such a way as to get longer with approach to a middle portion in the longitudinal direction of the relief valve.

5. The liquid sealed vibration isolating device according to claim 4, wherein the unsupported portion is of rectilinear shape.

6. The liquid sealed vibration isolating device according to claim 3, wherein the unsupported portion is of rectilinear shape.

7. The liquid sealed vibration isolating device according to claim 2, wherein a valve length of the relief valve varies in such a way as to get longer with approach to a middle portion in the longitudinal direction of the relief valve.

8. The liquid sealed vibration isolating device according to claim 7, wherein the unsupported portion is of rectilinear shape.

9. The liquid sealed vibration isolating device according to claim 2, wherein the unsupported portion is of rectilinear shape.

10. The liquid sealed vibration isolating device according to claim 1, wherein a valve length of the relief valve varies so as to become longer as the valve extends toward a middle portion in the longitudinal direction of the relief valve.

11. The liquid sealed vibration isolating device according to claim 10, wherein the unsupported portion is of rectilinear shape.

12. The liquid sealed vibration isolating device according to claim 1, wherein the unsupported portion is of rectilinear shape.

\* \* \* \* \*